INVENTOR
ROBERT P. TALAMBIRAS
BY
ATTORNEY

June 5, 1956 R. P. TALAMBIRAS 2,749,451

FLIP-FLOP CIRCUIT

Filed March 7, 1955 2 Sheets-Sheet 2

INVENTOR

ROBERT P. TALAMBIRAS

BY

ATTORNEY

United States Patent Office 2,749,451
Patented June 5, 1956

2,749,451

FLIP-FLOP CIRCUIT

Robert P. Talambiras, Cambridge, Mass., assignor to Sperry Rand Corporation, a corporation of Delaware Application March 7, 1955, Serial No. 492,626

11 Claims. (Cl. 307—88)

This invention relates to flip-flop circuits and more particularly to such a circuit employing a saturable core.

In the prior art a large number of flip-flop circuits have been suggested but in general they employ vacuum tubes or other elements likely to burn out. In an electronic computer where there are thousands of component parts, if the component parts have even a small possibility of failing in operation, the probability that one part will fail and thus adversely influence the operation of the whole computer is serious. It is therefore very desirable to provide components which have as high a degree of reliability as possible. As a corollary, it is desirable that the components be as simple as possible. It is an object of this invention to provide a flip-flop circuit having a very high degree of reliability and one which is extremely simple in construction.

A further object of the invention is to provide a flip-flop circuit of very small physical size.

Still another object of the invention is to provide a flip-flop circuit peculiarly adapted for use in connection with computing systems having magnetic amplifiers as their primary components.

An additional object of the invention is to provide a flip-flop circuit which will readily operate in conjunction with an input consisting of a varying unidirectional potential.

Still another object of the invention is to provide a flip-flop circuit in which the circuit will flip to one stable state at a predetermined first voltage as the potential at the input increases, and will flip back to the other stable state at a predetermined second voltage (lower than the first voltage) as the potential of the input is decreasing.

Another object of the invention is to provide a flip-flop circuit having improved characteristics.

In carrying out the invention, a saturable core is employed which has a first winding that is connected, in series with a rectifier, to a high frequency alternating voltage source. During positive half cycles of this source voltage, a current flows in the first winding, tending to saturate the core in the positive direction. During negative half cycles at the source voltage, the core is to some degree reverted by a separate source. A potential is induced in a second winding by the flux changes brought about by the voltages applied to the first winding. The second winding is connected in series with a parallel tuned circuit tuned to the frequency of the high frequency voltage source, and the input signal voltage source. The device has two stable modes of operation in the absence of an input signal.

In one mode the load current is small, and the terminal voltage of the first winding is nearly equal to the voltage of the high frequency voltage source. During positive half cycles of the high frequency source voltage, energy is transferred from the high frequency source to the parallel tuned circuit, the core acting as a transformer as the flux increases from negative remanence nearly to positive saturation. During negative half cycles of the high frequency voltage source, energy stored in the tuned circuit during the previous positive half cycle, together with a small amount of energy supplied by the reverting source serves to revert the core to negative remanence.

In the other mode, the load current is high, the core being saturated in the positive direction during most of the positive half cycle of the high frequency supply voltage. Very little potential is induced in the second winding because of the small change of flux, so that very little energy is stored in the tuned circuit. This small amount of stored energy is insufficient to revert the core more than a small amount, even though aided by the reverting source. The core becomes saturated early in the next positive half cycle, and the process repeats.

The potential of the input source, together with the total resistance of the input circuit, determines how much current flows in the input winding. This current adds to or subtracts from the effect of the reverting source current. If the input potential is made sufficiently positive while the device is operating in the low load current mode, reversion will be opposed so that the core is not completely reverted to negative remanence in one negative half cycle. During the next positive half cycle, the flux change is less than that during the previous positive half cycle, so that less energy is stored in the tuned circuit. The core is reset less during the following negative half cycle. The core flux reaches positive saturation during each positive half cycle of the high frequency source voltage but is reset less and less during succeeding negative half cycles, until the core flux remains near positive remanence or positive saturation throughout the cycle. At this time, the input potential may be reduced to zero, and the device continues to operate in the high current mode.

If the device is operating in the high current mode, and the input potential is made sufficiently negative, appreciable reversion will take place during the first negative half cycle, due to the negative input current and the reverting source current, which both act to revert the core. During the positive half cycle of the high frequency source voltage, the core flux reaches positive saturation, and energy is stored in the tuned circuit which acts to aid the reversion of the core during the next negative half cycle. The process is cumulative, and reversion to negative remanence will take place during each negative half cycle after a number of cycles have occurred. The input potential may then be reduced to zero, and the low current mode of operation will continue. There is an interval between the two flipping voltages. There are two stable operating points for any value of input potential within this interval.

Figures 1, 2, 4:
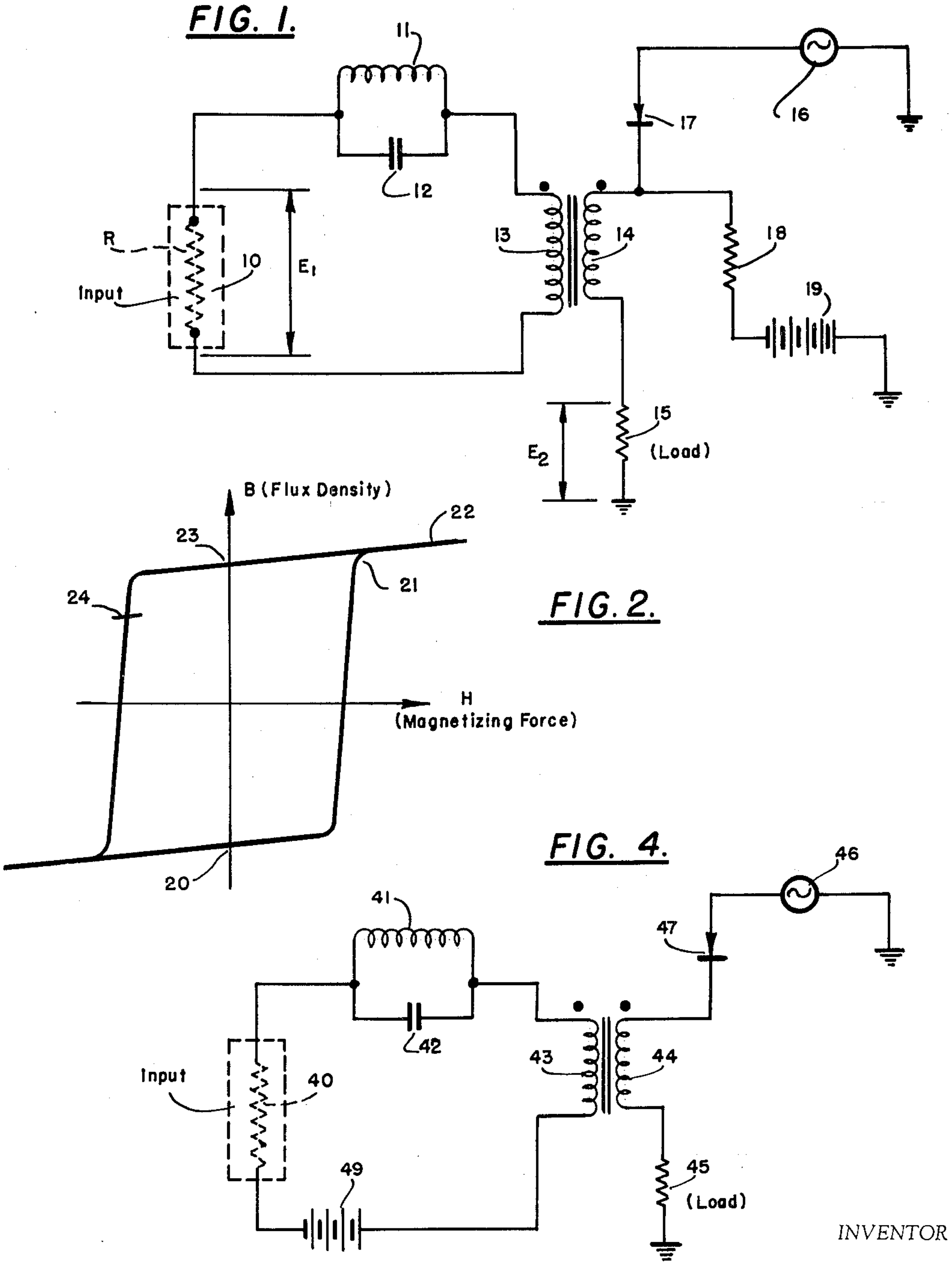
Figure 1 is a schematic diagram of one form of the invention.
Figure 2 is an idealized hysteresis loop of the core material used in the transformer of the device of Figure 1.
Figure 4 is a modified form of the invention of Figure 1.

In the device of Figure 1, an input is illustrated generally at 10 and has an inherent resistance of a value R. The resistance R for purposes of discussion may be assumed to include the inherent resistance of the entire input circuit which includes the inductor 11 and primary winding 13 of the transformer. The transformer has a core which may be made of a variety of materials, among which are the various types of ferrites and the various magnetic tapes, including Orthonik and 4–79 Moly-Permalloy. These materials may have different heat treatments to give them different properties. The magnetic material employed in the core should preferably, though not necessarily, have a substantially rectangular hysteresis loop (as shown in Figure 2). Cores of this character are now well known in the art. In addition to the wide variety of materials available, the core may be constructed in a number of geometries including both closed and open paths; for example, cup shaped, strips, and toroidal-shaped cores are possible. Those skilled in the art understand that when the core is operating on the horizontal (or substantially saturated) portions of the hysteresis loop, the core is generally similar in operation to an air core in that the coil on the core is of low effective impedance. On the other hand, when the core is operating on the vertical (or unsaturated) portions of the hysteresis loop, the effective impedance of the coils on the core will be high.

The winding 14 of the transformer is in series with the load 15, with the high frequency source 16 and the rectifier 17. There is a high resistance element 18 in series with a reverting battery 19, the purpose of which will be explained.

The input circuit includes an input 10, a parallel resonant circuit consisting of inductor 11 and condenser 12, and winding 13 of the transformer. The parallel resonant circuit is tuned to resonate at the frequency of source 16. The input 10 may be any device which produces a slowly varying direct current potential. For example, it may produce a potential that rises and falls with reference to its zero axis at a rate that is very slow as compared to the frequency of source 16. It also may produce square wave positive and negative pulses the repetition rate of which is always very low as compared to that of the source 16.

Figure 5:
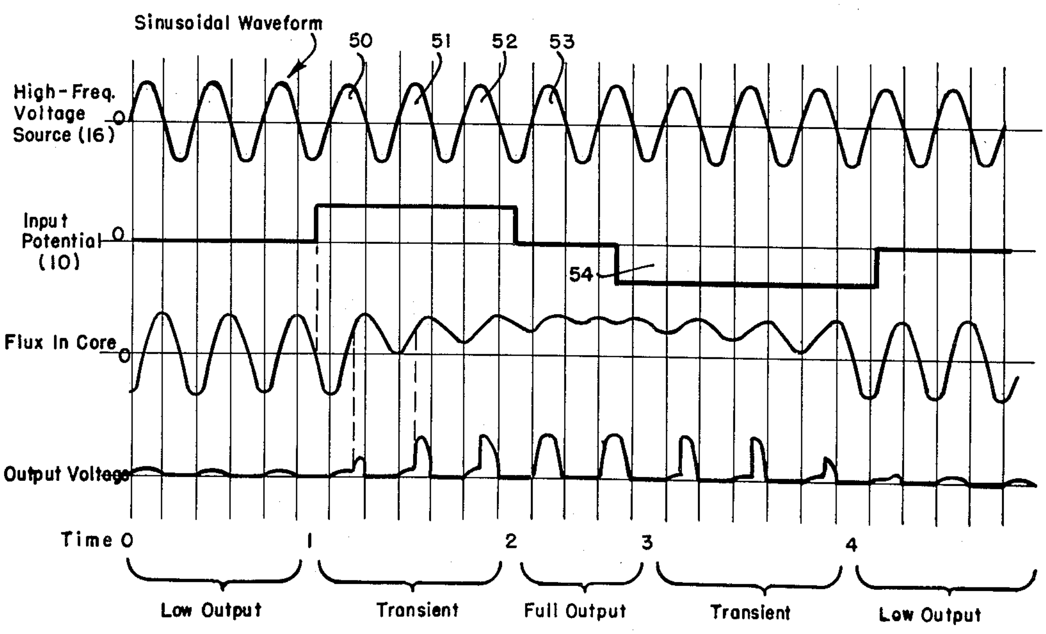
Figure 5 is a waveform diagram useful in explaining the operation of the device.

The operation of the invention can best be understood by reference to the waveform diagram of Figure 5. During the period prior to time 1 of Figure 5, current on the positive halves of the cycle flows through rectifier 17, secondary winding 14 and the load 15. This current flowing through the first winding 14 of the transformer induces current in the secondary winding 13 which flows through the input 10 and charges the condenser 12 of the resonant circuit 11—12. During the negative half cycles of source 16, the core has about the same magnitude of flux in a negative direction as was produced in the positive direction by the positive pulse of source 16. The negative magnetizing force in the core results from two effects. First, current flows from battery 19, ground, load 15, winding 14, and resistor 18. This current is in the opposite direction from that due to the positive pulses of source 16 and therefore tends to drive the core negatively. However, this current is much smaller than the positive pulses of source 16 and if it was the only source tending to revert the core, the core would be driven thereby from say remanence point 23 to point 24 on the hysteresis loop of Figure 2. However, in addition, the condenser 12 discharges through input 10 and winding 13, producing an additional current tending to revert the core and this current is larger than that due to the battery 19 and together with the battery 19 causes a sufficient negative flux to drive the core from positive remanence 23 to negative remanence 20. Hence, prior to time 1 of Figure 5, the core is driven from negative remanence point 20 to say point 21 due to a positive pulse from source 16. At the conclusion of the positive pulse the core returns to positive remanence 23. When the source 16 goes negative, the charge on condenser 12 plus the potential of battery 19, acting on the windings 13 and 14 respectively, provide negative flux to drive the core from positive remanence 23 near to negative saturation so that the core returns to negative remanence 20 at the conclusion of the negative half cycle of the source 16.

At time period 1 of Figure 5, an input potential at input 10 appears in the positive direction and continues until time 2. Due to the input potential $E_1$, a current flows through winding 13 which opposes the reverting effect of condenser 12 and consequently the core is only partially reverted by the condenser 12 and battery 19. Hence, since the core is not completely reverted to negative remanence 20, the next positive pulse 50 from source 16 drives the core to saturation at an earlier point in its half cycle than it did prior to time 1. Hence, the core becomes saturated at an earlier time during the positive half cycle and less energy is induced in coil 13, due to the saturation of the core. Hence, condenser 12 is charged to a lesser degree than it was during time period 1 and it will provide less reverting effect on the core. The next positive pulse 51 from source 16 will drive the core to saturation at a still earlier point in its half cycle so that the amount of flux change in the core is less than it was in the case of pulse 50 and the energy induced in winding 13 is less than at any previous time. The condenser 12 is therefore charged to a lesser degree than at any previous time and as it discharges during the reverting period, the amount of reversion is less than at any previous time. It follows that the next positive power pulse 52 will find the core almost saturated at the beginning of the pulse so that practically no energy is induced in winding 13 and the charge on condenser 12 will be very small. Hence, the reverting effect will be only slightly greater than that due to battery 19. This process is cumulative until finally the point is reached where a pulse such as 53 drives the core to saturation at a very early point of its duration and the only reverting effect is that due to battery 19 which, as has been said, is merely sufficient to revent the core to say point 24 on the hysteresis loop of Figure 2. Hence, as shown during the interval between times 2 and 3 of Figure 5, each positive pulse of the source 16 drives the core to saturation and during the interval of each negative pulse the battery 19 reverts the core only a small amount. Hence, the variations in the flux of the core are reduced to a ripple with only small dips below saturation.

If as shown at time period 3, a negative pulse 54 appears at the input 10, the current resulting therefrom will tend to revert the core and will thus increase the energy induced in winding 13 in response to each positive pulse from the source 16. Hence during each positive half cycle of the source, the charge on condenser 12 will be greater than during time period 2–3 of Figure 5. During the reverting or negative half cycle periods, the condenser 12 will now be supplying reverting current in addition to that of the input 10 and the apparatus will be restored to the stable state that it had prior to time 1 of Figure 5. In other words, following time 4 of Figure 5, the apparatus is in the same state that it was prior to time 1.

Figure 3:
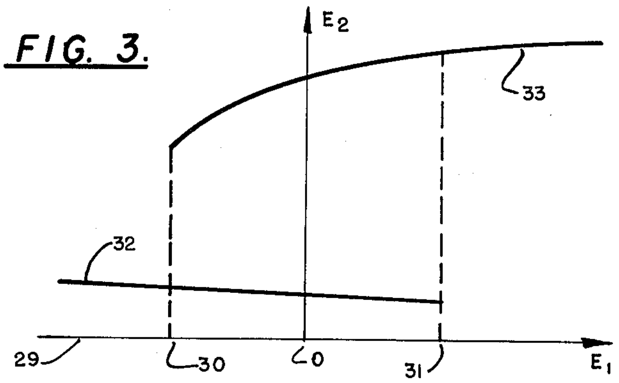
Figure 3 is a curve showing the relation of input and output potentials of the device of Figure 1.

In Figure 3, there is shown the transfer characteristics of the device. The curves 32 and 33 show the potential along axis $E_2$ of the output when the potential of the input is varied along axis $E_1$. For example, assuming that the potential at the input $E_1$ is negative at point 29 and increases beyond negative point 30 to positive value 31, the device will abruptly flip from its first to its second stable state at point 31 and the output current will be transferred abruptly from curve 32 to curve 33. If now the input potential is reduced along axis $E_1$, the device will not flip back to its first stable state (curve 32) until the input potential is reduced to negative value 30. In other words, there is a substantial differential between the potentials required to flip the device from one stable state to the other and consequently instability is avoided in event the input source is a slowly and continuously varying potential.

In order to secure an abrupt transfer characteristic as shown in Figure 3, the resistance R of the input circuit should be kept low and the capacity of condenser 12 should be made relatively large. The resistance of load 15 should also be kept low.

Figure 4 is a modified form of the invention having the same characteristics as Figure 1 and operating in substantially the same way, the only essential difference being that the reverting current is supplied by a source of potential 49 in the input circuit instead of by a source of potential in the output circuit. Parts 40 to 47 inclusive of Figure 4 correspond to parts 10 to 17 respectively of Figure 1. Instead of connecting battery 19 to coil 14 as shown in Figure 1, the battery 49 of Figure 4 is connected to the winding 43. In either case the function of the battery is the same, namely it supplies a magnetizing force on the core tending to drive it in the negative direction, whereas the positive pulses from source 46 tend to drive the coil 44 in the positive direction.

I claim to have invented:

1. A circuit having two stable states comprising a saturable core, means for periodically applying pulses of magnetizing force to the core, means applying reverting magnetizing forces to the core during the spaces between the first-named pulses of magnetizing force, input means for applying magnetizing force to the core which algebraically adds to one of the other magnetizing forces and thereby determines whether or not the core is saturated, said input means including means whereby the core is driven to saturation when the input exceeds a predetermined value and which operates the core below saturation when the input is below another predetermined value which is substantially less than the first-named predetermined value, and output means for giving a different signal when the core is saturated than when it is unsaturated.

2. A circuit having two stable states comprising a saturable core, means for applying spaced pulses of magnetizing force to the core, means for partially reverting the core during the spaces between pulses, winding means on the core, input means controlled by the input signals and the current induced in the winding means for causing the device to assume one stable state in which the core is saturated in response to one condition at the input and another stable state in response to another condition at the input, and output means for producing different conditions at the output in response to the two stable states respectively.

3. A system having two stable states comprising a transformer having first and second windings, means for applying high frequency spaced power pulses to the first winding, means applying to one of the windings a reverting current which during the spaces between power pulses tends to partially revert the core, a closed circuit including the second winding, a resonant element in said closed circuit and tuned to the frequency of said power pulses, said resonant element comprising an inductor and a condenser in parallel, said closed circuit also including an input for receiving control signals, said condenser having such large capacity and the resistance of the closed circuit being so small that when the potential applied to the input rises to a first predetermined value the system will flip to a second stable state in which the magnetizing forces on the core saturate it and the system will remain in the second stable state until the potential applied to the input is lowered below a second predetermined value at which time the system is flipped back to its first stable state, and output means which has different outputs for the two stable states respectively.

4. A system having two stable states as defined in claim 3 in which the output means is in series with the first winding and the source of high frequency pulses so that it receives large amplitude pulses when the core is saturated and substantially no output when the core is unsaturated.

5. A system having two stable states comprising a transformer having first and second windings and a saturable core, means for feeding a train of spaced pulses through the first winding, means for applying a steady current through one of said windings which tends to partially revert the core during the spaces between pulses, a closed circuit in series with the second winding, said closed circuit including in series with it a parallel resonant circuit, said parallel resonant circuit comprising an inductor and a condenser in parallel, said closed circuit also including an input, the capacity of the condenser being so large, the resistance of the closed circuit being so small and the magnitude of the pulses and the reverting currents being so interrelated that as the input potential rises to a predetermined value the system will flip from its first to its second stable state and will not flip back until the input potential is lowered to a second predetermined value substantially below the first value, and output means for giving different outputs respectively in the two stable states.

6. A system having two stable states as defined in claim 5 in which the second-named means is in series with the first winding.

7. A system having two stable states as defined in claim 6 in which the output means is in series with the first-named means and the first winding, so that when the latter has low impedance large pulses will flow in the output means.

8. A system having two stable states as defined in claim 5 in which the second-named means is in series with the closed circuit.

9. A system having two stable states as defined in claim 8 in which the output means is in series with the first-named means and the first-named winding, so that when the latter has low impedance large pulses will flow in the output means.

10. A system having two stable states comprising a transformer having first and second windings, said transformer having a core capable of being driven to saturation, a source of high frequency alternating current, a rectifier, a load, a circuit connecting the source, the rectifier, the first winding and the load in series with each other so that pulses of one polarity may flow from the source through the series circuit, one side of the rectifier being directly connected to one end of the first winding, means connected to the series circuit between the rectifier and said first winding for supplying a steady current through the first winding during the spaces between and in opposite direction to the pulses from said source which flow through the first-named winding, a closed circuit including the second winding, the closed circuit including an input and also including in series therewith a parallel resonant circuit tuned to the frequency of said source, said parallel resonant circuit having an inductor and a condenser in parallel with each other, the components of the above recited system having such relative values that when the input potential is increased to a predetermined value the device will flip from a first stable state where the core was operating mainly on an unsaturated portion thereof to a second stable state where the pulses of said source drive the core to saturation whereby they may readily flow through the first winding to the load giving a large output and when the input potential is decreased the device will not flip back to its first stable state until the input potential drops to a second predetermined value substantially below the first predetermined value.

11. A system having two stable states comprising a transformer having first and second windings, said transformer having a core capable of being driven to saturation, a source of high frequency alternating current, a rectifier, a load, a circuit connecting the source, the rectifier, the first winding and the load in series with each other so that pulses of one polarity may flow from the source through the series circuit, a closed circuit including the second winding, the closed circuit including an input and also including in series therewith a parallel resonant circuit tuned to the frequency of said source, said parallel resonant circuit having an inductor and a condenser in parallel with each other, means in the closed circuit for passing a steady direct current through the second winding tending to partially revert the core during the spaces between said pulses of said one polarity, the components of the above recited system having such relative values that when the input potential is increased to a predetermined value the device will flip from a first stable state where the core was operated mainly on an unsaturated portion thereof to a second stable state where the pulses of said source drive the core to saturation whereby they may readily flow through the first winding to the load giving a large output and when the input potential is decreased the device will not flip back to its first stable state until the input potential drops to a second predetermined value substantially below the first predetermined value.

No references cited.